United States Patent
Fermer et al.

(10) Patent No.: US 9,327,677 B2
(45) Date of Patent: May 3, 2016

(54) ARRANGEMENT COMPRISING A PYROTECHNICAL DEVICE AND A FIRST MECHANICAL STRUCTURE

(71) Applicant: VOLVO CAR CORPORATION, Gothenburg (SE)

(72) Inventors: Mikael Fermer, Partille (SE); Tommy Zippert, Gothenburg (SE); Staffan Jaktling, Vastra Frolunda (SE); Christina Gullander, Partille (SE); Birger Svensson, Kullavik (SE); Niklas Graberg, Saro (SE); Anders Fredriksson, Gothenburg (SE); Henrik Karlsson, Lidkoping (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/619,625

(22) Filed: Feb. 11, 2015

(65) Prior Publication Data
US 2015/0232058 A1 Aug. 20, 2015

(30) Foreign Application Priority Data
Feb. 18, 2014 (EP) .................................... 14155569

(51) Int. Cl.
*B60R 21/38* (2011.01)
*B60R 21/36* (2011.01)
*E05D 3/12* (2006.01)
*B60R 21/00* (2006.01)

(52) U.S. Cl.
CPC ................. *B60R 21/38* (2013.01); *B60R 21/36* (2013.01); *E05D 3/125* (2013.01); *B60R 2021/0048* (2013.01)

(58) Field of Classification Search
CPC ....................................................... B60R 21/38
See application file for complete search history.

(56) References Cited

U.S. PATENT DOCUMENTS

| | | | |
|---|---|---|---|
| 6,415,882 B1 * | 7/2002 | Schuster ................. | B60R 21/38 16/223 |
| 6,892,843 B2 * | 5/2005 | Schillaci ................. | E05C 17/24 180/274 |
| 6,938,715 B2 * | 9/2005 | Hamada .............. | B60R 21/0136 180/274 |

(Continued)

FOREIGN PATENT DOCUMENTS

| | | | | |
|---|---|---|---|---|
| DE | EP 1757496 A2 * | 2/2007 | .............. | B60R 21/38 |
| DE | EP 2474453 A1 * | 7/2012 | .............. | B60R 21/38 |

(Continued)

OTHER PUBLICATIONS

Extended European Search Report Dated Jun. 11, 2014, Application No. 14155569.8-1503, Applicant Volvo Car Corporation, 5 Pages.

*Primary Examiner* — Nicole Verley
(74) *Attorney, Agent, or Firm* — Brooks Kushman P.C.

(57) ABSTRACT

The present disclosure relates to an arrangement comprising a pyrotechnical device and a first mechanical structure. The pyrotechnical device is adapted to, directly, or indirectly, influence the first mechanical structure at a first location, such that the first mechanical structure is exposed to a deformation and/or a displacement. The deformation and/or displacement of the first mechanical structure at the first location is adapted to at a second location, being different from the first location, change a functional mode of the first mechanical structure and/or of a second mechanical structure connected to the first mechanical structure by means of direct mechanical influence. The disclosure further relates to a vehicle comprising such an arrangement.

20 Claims, 8 Drawing Sheets

(56) References Cited

U.S. PATENT DOCUMENTS

| | | | | |
|---|---|---|---|---|
| 6,942,056 | B2* | 9/2005 | Nadeau | B60R 21/38 180/274 |
| 7,410,027 | B2* | 8/2008 | Howard | B60R 21/38 180/271 |
| 7,537,073 | B2* | 5/2009 | Kalliske | B60R 21/38 16/222 |
| 7,594,555 | B2* | 9/2009 | Lutter | B60R 21/34 180/274 |
| 7,617,898 | B2* | 11/2009 | Leong | B60R 21/38 180/69.2 |
| 7,815,007 | B2* | 10/2010 | Mori | B60R 21/38 180/274 |
| 7,845,053 | B2* | 12/2010 | Marsh | E05D 11/06 16/286 |
| 7,954,588 | B2* | 6/2011 | Inomata | B60R 21/38 180/274 |
| 7,987,939 | B2* | 8/2011 | Kisiler | B62D 25/105 180/69.2 |
| 8,534,410 | B2* | 9/2013 | Nakaura | B60R 21/38 180/274 |
| 8,544,590 | B2* | 10/2013 | McIntyre | B60R 21/38 180/274 |
| 8,662,236 | B2* | 3/2014 | Koestler | B60R 21/38 180/274 |
| 8,893,354 | B2* | 11/2014 | McIntyre | B60R 21/38 16/288 |
| 8,939,249 | B2* | 1/2015 | Kuhr | B60R 21/38 180/274 |
| 2009/0145681 | A1* | 6/2009 | Hayashi | B60R 21/38 180/274 |
| 2013/0227818 | A1* | 9/2013 | Zippert | B60R 21/38 16/366 |
| 2015/0048651 | A1* | 2/2015 | Schabenberger | B60R 21/38 296/187.04 |
| 2015/0107930 | A1* | 4/2015 | Kugler | B60R 21/38 180/274 |
| 2015/0151712 | A1* | 6/2015 | Mardi | B60R 21/38 296/187.04 |
| 2015/0183693 | A1* | 7/2015 | Aoyama | C06D 5/00 102/530 |
| 2015/0191145 | A1* | 7/2015 | Farooq | B60R 21/38 180/274 |
| 2015/0211265 | A1* | 7/2015 | Uyanik | E05B 83/24 292/195 |

FOREIGN PATENT DOCUMENTS

| | | | | |
|---|---|---|---|---|
| DE | 102011075267 A1 | * | 11/2012 | ............ B60R 21/38 |
| DE | 102013016345 A1 | * | 7/2014 | ............ B60R 21/38 |
| EP | 1323597 A1 | | 7/2003 | |
| EP | 2301814 A1 | | 3/2011 | |
| FR | EP 1946980 A1 | * | 7/2008 | ............ B60R 21/38 |
| FR | 2926272 A1 | * | 7/2009 | ............ B60R 21/38 |
| GB | 2354797 A | | 4/2001 | |
| GB | 2382549 A | | 6/2003 | |
| JP | DE 102008011468 A1 | * | 9/2008 | ............ B60R 21/36 |
| SE | EP 2857290 A1 | * | 4/2015 | ............ B62D 25/12 |

\* cited by examiner

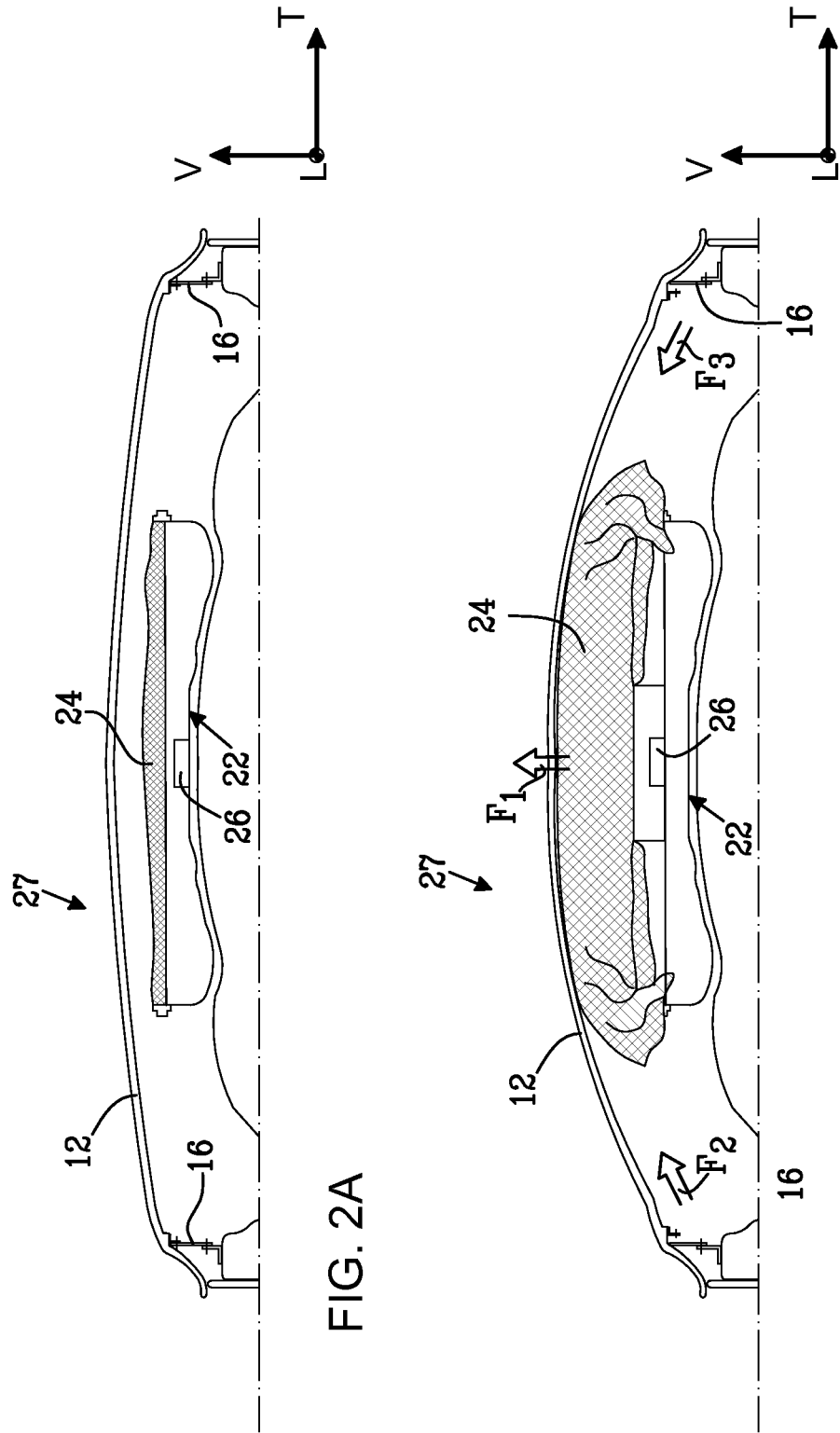

ARRANGEMENT COMPRISING A PYROTECHNICAL DEVICE AND A FIRST MECHANICAL STRUCTURE

CROSS-REFERENCE TO RELATED APPLICATIONS

This application claims foreign priority benefits under 35 U.S.C. §119(a)-(d) to European patent application number EP 14155569.8, filed Feb. 18, 2014, which is incorporated by reference in its entirety.

TECHNICAL FIELD

The present disclosure relates to an arrangement comprising a pyrotechnical device and a first mechanical structure. The disclosure further relates to a vehicle comprising such an arrangement.

BACKGROUND

It is well known to the skilled person that pyrotechnical processes may release large quantities of energy in a short time, and/or produce gases, light, sound or a combination of these.

Pyrotechnical devices are commonly used to obtain a quick activation of various devices. As an example, in the automotive industry pyrotechnical devices are utilized in order to quickly activate safety devices in a vehicle, such as an airbag or a seat belt tensioner.

An example of a vehicle utilizing pyrotechnical devices, is a vehicle comprising a deployable bonnet. The bonnet covers an engine compartment and is connected to the vehicle by hinge arrangements, such that the bonnet can be opened in order to allow access to the engine compartment for maintenance and/or repair. If the vehicle is involved in an accident, in which the front part of the vehicle hits a vulnerable road user, such as a pedestrian or bicyclist, it is not uncommon that the vulnerable road user is thrown onto the bonnet of the vehicle and that the head of the vulnerable road user impacts on the bonnet. In order to reduce the severity of these accidents, it is known to use a deployable bonnet. By raising at least the rear part of the bonnet to an "impact position", a so called deployed position or pop-up position, the distance between the bonnet and any hard engine parts is increased. The bonnet may be lifted to the deployed position by means of an inflatable member such as an airbag, which may be activated by a pyrotechnical device. The airbag may further be utilized to cover a portion of the windscreen and/or A-pillars.

There may also be pyrotechnical devices located at the hinge arrangements in order to change the functional mode of the hinge arrangements, such that the bonnet is allowed to be displaced to the deployed position. The pyrotechnical devices may e.g., be activated to release a release pin, thereby allowing previously locked hinge arrangement members to move in relation to each other.

The vehicle comprising the deployable bonnet may hence comprise three pyrotechnical devices, one for activation of the airbag raising the bonnet, and one at each hinge arrangement for changing its functional mode, such that the bonnet is allowed to be raised to the deployed position. However, utilizing three different pyrotechnical devices may make the arrangement expensive and/or difficult to mount in the vehicle at the production facility.

An alternative to using three pyrotechnical devices is to instead use only one pyrotechnical device, e.g., located at the airbag, which via a complicated mechanical release system, e.g., comprising bars, wires, and/or release elements, can change the functional mode of the hinge arrangement, such that the bonnet may assume the deployed position. However, such a mechanical release system involves many different parts, which makes the arrangement heavy and may require large packaging volume, as well as making the arrangement expensive and difficult to mount in the vehicle at the production facility.

SUMMARY

An object of the present disclosure is to overcome or ameliorate at least one of the disadvantages of the prior art, or to provide a useful alternative.

Thus, in a first aspect of the present disclosure there is provided an arrangement comprising a pyrotechnical device, and a first mechanical structure. The pyrotechnical device is adapted to, directly, or indirectly, influence the first mechanical structure at a first location, such that the first mechanical structure is exposed to a deformation and/or a displacement. The deformation and/or displacement of the first mechanical structure at the first location is adapted to at a second location, being different from the first location, change a functional mode of the first mechanical structure and/or of a second mechanical structure connected to the first mechanical structure by means of direct mechanical influence.

The arrangement may be adapted for use in a vehicle. As an alternative, or a complement, it may be adapted for use in a machine, building or construction.

The pyrotechnical device may act directly on the first mechanical structure or indirectly. Purely as an example of a direct influence, the pyrotechnical device may be used to act on a member of the hinge arrangement, e.g., a pyrotechnical piston being mechanically connected to the hinge member. Purely as an example of an indirect influence, the pyrotechnical device may be used to inflate an airbag, which airbag acts on a bonnet, forming the first mechanical structure. The pyrotechnical device then acts on the bonnet via the airbag, i.e., indirectly.

The influence by the pyrotechnical device exposes the first mechanical structure to a deformation and/or a displacement. The first mechanical structure may be influenced at the first location by being displaced, e.g., the inflating airbag pushing the bonnet upwards. The bonnet is, as mentioned, pushed upwards, i.e., displaced. At the same time, the bonnet is also deformed, since the portion being above the bonnet is raised quicker than e.g., the portions of the bonnet being located adjacent to the hinges, since the hinges may restrict the upward movement. The portion of the bonnet adjacent to the hinge is located at a second location, which is different from the first location. Being "different from" means that the two locations are spaced apart from each other. The two locations may, as in the bonnet example above, both be at the underside of the bonnet but spaced apart. As another example, the first location may be at one side of the first mechanical structure, e.g., an inside or a lower side, and the second location at another side, e.g., an outside or an upper side of the first mechanical structure.

The second mechanical structure may be directly, or indirectly e.g., by means of a bracket, connected to the first mechanical structure. Purely as an example, a hinge arrangement, as the second mechanical structure, may be connected to a bonnet being the first mechanical structure.

The term "functional mode" is herein used to denote a way of operation. Purely as an example the hinge arrangement mentioned above comprises a first functional mode being utilized during normal operation of the vehicle, e.g., when driving or when opening the bonnet for maintenance and/or repair. However, in case a collision or an imminent collision with a vulnerable road user occurs or is detected, the safety system for deploying the bonnet may be activated. The hinge arrangement may then change the first functional mode to a second functional mode, wherein the relative movement between the hinge members allows the bonnet to be raised to the deployed position.

The term "direct mechanical influence" is used herein to describe that no complicated mechanical linking system is used. Instead it is the deformation and/or displacement itself that directly causes the change of functional mode. There are e.g., no wires, bars, etc., involved to transfer a mechanical movement in order to change the functional mode. Purely as an example relating to the arrangement mentioned above, the deformation of the bonnet itself, i.e., the first mechanical structure, causes a secondary deformation at the hinge arrangement, since the hinge arrangement is connected to the bonnet, which changes the functional mode of the hinge arrangement. It is the first mechanical structure which exerts the mechanical influence, due to its deformation and/or displacement.

By utilizing an arrangement according to the disclosure, one single pyrotechnical device may be used to influence the arrangement not only at the first location, but also at the second location. Hence, it is possible to use fewer pyrotechnical devices and/or a less complicated mechanical linking system than for known technology. This may lead to reduced cost and/or to that mounting of the arrangement is made easier. Weight and/or packaging volume may be reduced as compared to known technology. The arrangement may also be made more robust and/or reliable.

The arrangement may be a bonnet arrangement for a vehicle. The bonnet arrangement comprises a bonnet, forming the first mechanical structure, an airbag arrangement comprising an airbag and the pyrotechnical device, and a hinge arrangement providing a hinged connection between the bonnet and a body structure of the vehicle, the hinge arrangement forming the second mechanical structure. The airbag arrangement is adapted to displace the bonnet from a closed position to a deployed position by inflating the airbag upon activation of the pyrotechnical device, the bonnet thereby being exposed to a deformation and/or a displacement at a first location corresponding to the airbag. The hinge arrangement is in a first functional mode displaceable between a first position corresponding to the closed position of the bonnet and a second position corresponding to an open position of the bonnet, and in a second functional mode the hinge arrangement is displaceable between the first position corresponding to the closed position of the bonnet and a third position corresponding to the deployed position of the bonnet. The bonnet is connected to the hinge arrangement, such that the deformation and/or displacement of the bonnet causes the hinge arrangement to change from the first functional mode to the second functional mode.

The words front and rear are used herein in relation to a vehicle on the assumption that front is the part coming first in the normal forward driving direction. The terms denoting directions, such as longitudinal, transverse and vertical, also relate to the vehicle. Longitudinal is along the normal driving direction. Transverse is perpendicular to the longitudinal direction but in the same horizontal plane, i.e., sideways or laterally in the vehicle. Vertical is perpendicular to that plane. Terms denoting locations and directions, which are used for vehicle parts, such as for a bonnet arrangement and a hinge arrangement, relate to when the arrangement is mounted in the vehicle.

The airbag may also be utilized to cover a portion of the windscreen and/or A-pillars when inflated.

The hinge arrangement of the above-mentioned bonnet arrangement may comprise a first hinge member adapted to be attached, directly or indirectly, to the body of the vehicle, a second hinge member, having a first end and a second end, and a third hinge member adapted to be attached, directly or indirectly, to the bonnet. The first end of the second hinge member is pivotally connected to the first hinge member at a first pivot axis providing the first functional mode, e.g., allowing the bonnet to be opened for maintenance and/or repair. The second end of the second hinge member is pivotally connected to the third hinge member at a second pivot axis providing the second functional mode, which allows the bonnet to assume the deployed position. The third hinge member is further connected to the second hinge member by means of a retaining member, which prevents relative motion between the second hinge member and the third hinge member in a longitudinal and/or a vertical direction. The retaining member is adapted to be deactivated at a predetermined force, which predetermined force is equal to or less than a force is exerted on the retaining member by the third hinge member when the bonnet is deformed and/or displaced as a result of the airbag arrangement being activated by the pyrotechnical device, and which predetermined force is larger than a force is exerted on the retaining member by the third hinge member during normal operation of the vehicle and during normal opening of the bonnet in the first functional mode. The deactivation of the retaining member allows the third hinge member to pivot in relation to the second hinge member, such that the bonnet may assume the deployed position in the second functional mode.

The movement of the second hinge member relative to the first hinge member may be a pure rotation, or it may be a combination of rotation and translation, e.g., the first pivot axis moving in a slot in either, or both of, the first hinge member and the second hinge member. Similarly, the movement of the third hinge member relative to the second hinge member may be a pure rotation or a combination of rotation and translation, e.g., in a slot in either, or both of, the second hinge member and the third hinge member.

The predetermined force may be selected such that it is larger than a force being exerted on the retaining member by the third hinge member during normal operation of the vehicle, e.g., when driving over uneven ground. The predetermined force may be selected such that it is also larger than a force being exerted on the retaining member by the third hinge member during normal opening of the bonnet in the first functional mode for normal maintenance and/or repair. Further, it is desired that the predetermined force is selected such that it is larger than a typical force being used when adjusting the bonnet to fit during e.g., manufacturing or repair and/or during a burglary attempt to open the bonnet.

One, two, three or more retaining members may be provided. The force needed to deactivate the retaining member may be selected by varying the size, shape, material, number of retaining members, etc.

The retaining member may be adapted to be deactivated in a transverse direction of the vehicle, the predetermined force having at least a transverse component. The retaining member may e.g., be deactivated by being pulled in the transverse direction, e.g., a release pin being pulled out of an opening in the hinge arrangement due to the deformation of the bonnet.

The retaining member may further be adapted to, when in an active state, prevent relative motion between the second hinge member and the third hinge member in a transverse direction. Thereby the third hinge member, and hence the bonnet to which it is connected, is retained in a fixed position relative to the rest of the hinge arrangement, avoiding, or at least minimizing, the risk of a rattling noise arising from the bonnet, e.g., when driving over uneven ground. Further, the risk that the third hinge member is displaced relative to the second hinge member during e.g., adjustment of the bonnet or if a load is applied in the transverse direction, e.g. due to a side collision, is reduced or avoided.

The predetermined force, or its transverse component, may be between 0.1 and 10 kN, preferably between 0.2 and 8 kN, more preferably between 0.5 and 5 kN, and most preferably between 0.8 and 3 kN. The notation kN is an abbreviation for kilonewton.

Purely as an example, if the retaining member is adapted to be deactivated in a transverse direction, such as a release pin being pulled out of an opening in the hinge arrangement due to the deformation of the bonnet, the force used for deactivation, i.e., the pulling force, is substantially transverse and the predetermined force may be selected such that its transverse component is between 0.1 and 10 kN, preferably between 0.2 and 8 kN, more preferably between 0.5 and 5 kN, and most preferably between 0.8 and 3 kN. Even if the pulling force may deviate from the transverse direction, its longitudinal and vertical components are in that case less than the transverse component.

The retaining member may comprise a detachment unit having the predetermined force as a detachment force, such as an expander pin, a rivet, a push nut, a push-on fastener or a locking washer. The detachment force may e.g., be used to pull the expander pin out of its opening in the hinge arrangement. As an alternative, or a complement, to the mentioned examples of a mechanical detachment unit, it is possible to use a magnetic detachment unit, wherein a magnetic force is overcome to deactivate the retaining member.

The second hinge member and/or the third hinge member may comprise an opening, the retaining member going through the opening.

The opening in either or both of the second hinge member and/or the third hinge member may have a closed circumference. This helps to keep the second hinge member and the third hinge member in a fixed relative position, when the retaining member is in an active state.

The retaining member may be located at, or adjacent to, an end of the third hinge member, which end is opposite to the second pivot axis. Thereby the portion of the third hinge member, which portion is distant from the second pivot axis, may be displaced in a direction away from the second hinge member by the deformed bonnet. Since the bonnet rotates around the second pivot axis to reach the third position, it is normally desired that the second pivot axis is more or less intact also when the bonnet has deformed.

As an alternative to, or a complement to, a detachment unit, the retaining member may comprise a friction means located at the second hinge member and/or the third hinge member, the friction means being adapted to retain the third hinge member to the second hinge member, in the longitudinal and/or vertical direction, but allowing a portion the third hinge member to move away from the second hinge member in the transverse direction, thereby allowing the third hinge member to pivot in relation to the second hinge member, such that the bonnet may assume the deployed position.

In an embodiment the arrangement is suitable for a vehicle. The arrangement in this embodiment comprises a hinge arrangement for a vehicle, the hinge arrangement forming the first mechanical structure and a pyrotechnical piston, comprising the pyrotechnical device, the pyrotechnical piston being adapted to displace the bonnet to the deployed position by acting on the hinge arrangement. The hinge arrangement is in a first functional mode displaceable between a first position corresponding to the closed position of the bonnet and a second position corresponding to an open position of the bonnet, and in a second functional mode the hinge arrangement is displaceable between the first position corresponding to the closed position of the bonnet and a third position corresponding to the deployed position of the bonnet. A deformation of the hinge arrangement caused by the pyrotechnical piston being activated causes the hinge arrangement to change from the first functional mode to the second functional mode.

For a hinge arrangement comprising, a first, a second and a third hinge member like the ones described above, the arrangement may be configured such that the third hinge member and the second hinge member are locked to each other at forces below the predetermined force, i.e., during normal operation of the vehicle, e.g., when driving the vehicle or during normal opening of the bonnet. This corresponds to a first functional mode. When the pyrotechnical piston is activated, it acts on the hinge arrangement in order to displace the bonnet to the deployed position. The deformation caused on the hinge arrangement by the pyrotechnical piston is used to release the third hinge member from the second hinge member in order to allow rotation around the second pivot axis. This corresponds to a second functional mode of the arrangement.

In another embodiment, which is also suitable for a vehicle, an arrangement according to that embodiment may be used either by itself or in combination with the above bonnet arrangement or the previously mentioned arrangement with the hinge arrangement forming the first mechanical structure. The arrangement then comprises a bonnet, forming the first mechanical structure, a hinge arrangement for a vehicle, adapted to be connected to the bonnet and located at, or adjacent to, a first end of the bonnet, and a pyrotechnical piston, comprising the pyrotechnical device. The pyrotechnical piston is adapted to displace the bonnet to the deployed position by acting on the hinge arrangement. The deformation of the bonnet caused by the pyrotechnical piston being activated and acting on the hinge arrangement is adapted to cause a second end of the bonnet being opposite to the first end of the bonnet to be displaced and to be raisable by a biasing element.

The first end may be the rear end and the second end the front end, or vice versa. The bonnet is for this embodiment intended to be lifted both at the rear end and at the front end in order to reach the deployed position. The biasing element may be a pre-tensioned resilient element, such as a spring, which is arranged to be released by the deformation of the bonnet. Thereby only two pyrotechnical pistons are needed to raise the bonnet at both the front and the rear ends, while according to prior art technology four pyrotechnical pistons would be used.

In yet another embodiment, the arrangement comprises a mechanical component, forming the first mechanical structure, a pyrotechnical device being adapted to expose the mechanical component to an increased internal pressure at an internal surface of the mechanical component, the internal surface constituting the first location, and a surrounding structure, located at an external surface of the mechanical component, the external surface constituting the second location. The increased internal pressure is adapted to cause a deformation and/or displacement of the mechanical component and to bring it into a locking engagement with the surrounding structure to form a combined structure.

Purely as an example, the first mechanical structure may be an internal beam and the surrounding structure may be a surrounding beam arranged such that the internal beam and the surrounding beam form a beam-in-beam construction. The pyrotechnical device is located inside the internal beam. In the initial state, the internal beam is mechanically free from the surrounding beam, but located inside it. The mechanical properties are thus given by the mechanical properties of the internal beam itself.

However, when the pyrotechnical device is activated, the internal beam is exposed to an increased internal pressure at its internal side and hence deforms outwards towards the surrounding beam. Thereby locking elements on the external side of the internal beam are forced outwards into a locking engagement with the surrounding beam. Purely as an example, the locking engagement may be obtained by one or more pins being pushed into fixation holes. Thereby, the internal beam and the surrounding beam form a combined structure having improved mechanical properties as compared to the internal beam or the surrounding beam alone.

The principle of this embodiment may be used to rapidly change the mechanical properties of a structure. It may be useful in a front structure of a vehicle in order to adapt the front structure for different collision cases. It may further be useful in a machine, building or construction. The change of stiffness may be e.g., used to change the resonance properties of a building or a construction, e.g., in order to avoid damages to a structure from an earthquake.

It is obvious for the person skilled in the art that the mechanical component may have an arbitrary cross-section. The locking engagement between the mechanical component and the surrounding structure may be obtained by friction or by one or more locking elements. The surrounding structure may completely surround the mechanical component, or only a portion of it. It would also be possible with the reverse case, i.e., that the surrounding structure is adapted to deform inwards by applying an increased pressure at its external side and/or a decreased pressure at its internal side, such that the surrounding structure is brought into a locking engagement with the mechanical component.

As exemplified by the different embodiments of the arrangement according to the disclosure, the deformation and/or displacement caused by the pyrotechnical device may be used to release a component, as e.g., in the bonnet arrangement or the previously mentioned arrangement with the hinge arrangement forming the first mechanical structure. As an alternative, or a complement, the deformation and/or displacement may be used to lock a component, as described for the preceding embodiment.

According to a second aspect of the present disclosure, there is provided a vehicle comprising an arrangement as disclosed herein. One or more of the embodiments described above may be provided in the same vehicle.

BRIEF DESCRIPTION OF THE DRAWINGS

The present disclosure will hereinafter be further explained by means of non-limiting examples with reference to the appended drawings wherein:

FIGS. 2A-B illustrate the front end of FIGS. 1A-C as seen from a windscreen;

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

The embodiments described below in FIGS. 1-8 illustrate different embodiments of the arrangement according to the disclosure when mounted in a vehicle. However, it is also possible to utilize an arrangement according to the disclosure, e.g., like the one illustrated in FIG. 9, in other mechanical arrangements, such as a machine, a construction or a building.

The words front and rear used herein relate to a vehicle, where front is the part coming first in the normal forward driving direction. The terms denoting directions, such as longitudinal, transverse and vertical, also relate to the vehicle. Longitudinal is along the normal driving direction. Transverse is perpendicular to the longitudinal direction but in the same horizontal plane, i.e., sideways or laterally in the vehicle. Vertical is perpendicular to that plane. Terms denoting locations and directions, which are used for vehicle parts, such as for a bonnet arrangement and a hinge arrangement, relate to when mounted in the vehicle.

Figure 1A:
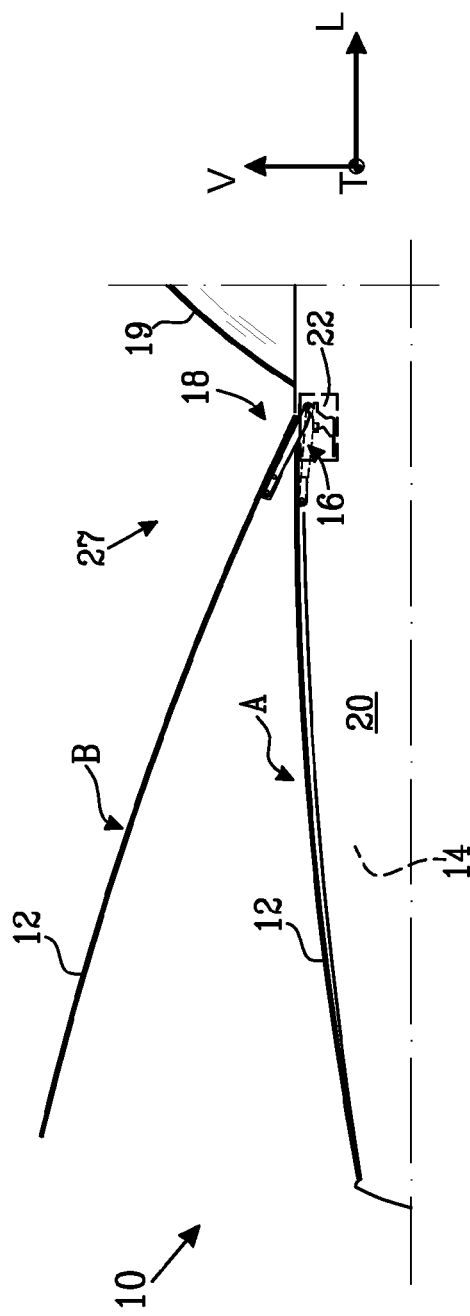
FIGS. 1A-B are schematic side views of a front end of a vehicle comprising an arrangement according to a first embodiment of the disclosure illustrating different positions for a bonnet.

FIG. 1A is a schematic side view of a front end of a vehicle 10, here a car. The vehicle 10 has a longitudinal direction L, a transverse direction T and a vertical direction V. The vehicle 10 is provided with a bonnet 12, which covers an engine compartment 14 and allows access to the engine compartment 14 for maintenance and/or repair. The bonnet 12 is connected to the vehicle 10 by a hinge arrangement 16, normally one hinge arrangement 16 adjacent to each lateral side of the bonnet 12. A rear end 18 of the bonnet 12 is directed towards a windscreen 19 of the vehicle 10. The hinge arrangement 16 provides a hinged connection of the bonnet 12 in relation to a body structure 20 of the vehicle 10. The hinge arrangement 16 is located adjacent to the rear end 18 of the bonnet 12. Normally, the bonnet 12 is in a closed position A covering the engine compartment 14. The bonnet 12 can be displaced to an open position B allowing normal access to the engine compartment 14 for maintenance and/or repair. The vehicle 10 is normally stationary when displacing the bonnet 12 to the open position B.

Figure 1B:
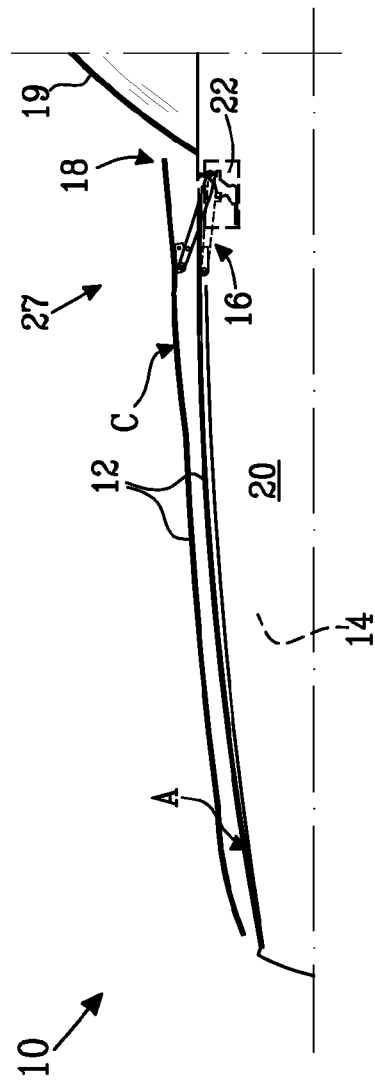

The bonnet 12 is connected to an actuator, such as an airbag arrangement 22, only schematically illustrated in FIGS. 1A and 1B, which is positioned somewhere in the vehicle 10, generally beneath the bonnet 12, as illustrated in FIGS. 2A and 2B. The airbag arrangement 22 comprises an inflatable airbag 24 and a pyrotechnical device 26 (e.g., inflator). The airbag 24 starts to inflate when the pyrotechnical device 26 is activated. Normally, one or more sensors (not shown) are used to detect a collision, or an imminent collision, with a vulnerable road user, such as a pedestrian or a cyclist. If detected, activation of the pyrotechnical device 26 is triggered. The airbag arrangement 22 is arranged to displace the bonnet 12 to a deployed position C, also called a pop-up position, see FIG. 1B. The closed position A is shown as a reference in FIG. 1B. The airbag 24 may further be utilized to cover a portion of the windscreen 19 and/or A-pillars.

In the deployed position C, a distance is formed between the bonnet 12 and hard parts of the engine, allowing deflection of the bonnet 12 and avoiding or minimizing the risk of the head or another body part of the vulnerable road user hitting any hard parts of the engine. Even if FIG. 1B illustrates that the rear end 18 is deployed, the bonnet 12 may also be raised at a front end, but normally the rear end 18 is raised to a higher position. The distance formed between the bonnet 12 and the hard parts of the engine is typically between 50 and 130 millimeters.

The bonnet 12, the airbag arrangement 22 and one or both of the hinge arrangements 16 are comprised in a bonnet arrangement 27, which is an example of a first embodiment of an arrangement according to the disclosure.

FIG. 2A illustrates the bonnet arrangement 27 of FIGS. 1A and 1B with the bonnet 12 in the closed position A, when seen from the windscreen. There is a hinge arrangement 16 adjacent to each lateral side of the bonnet 12. Further, the airbag arrangement 22 is seen below the bonnet 12.

FIG. 2B illustrates a situation when the airbag arrangement 22 has been activated by the pyrotechnical device 26. The airbag 24 is inflating and pushes the bonnet 12 upwards. The force F1 of the inflating airbag 24 causes the bonnet 12 to deform. The portions of the bonnet 12 being connected to the respective hinge arrangements 16 are thereby subjected to a force F2, F3 having at least a component in the transverse direction T. In the illustrated example, the transverse component is the largest component, but there is also a component in the vertical direction V and the longitudinal direction L. The influence of the forces F2, F3 is further explained below. The forces F2, F3 at the hinge arrangement may differ between the two lateral sides, e.g., depending on location and shape of the airbag in relation to the hinge arrangements 16, but have the same order of magnitude. Typically the forces F2, F3 have a transverse component, which may be above 1 kN, or above 3 kN or above 5 kN.

Figure 3:
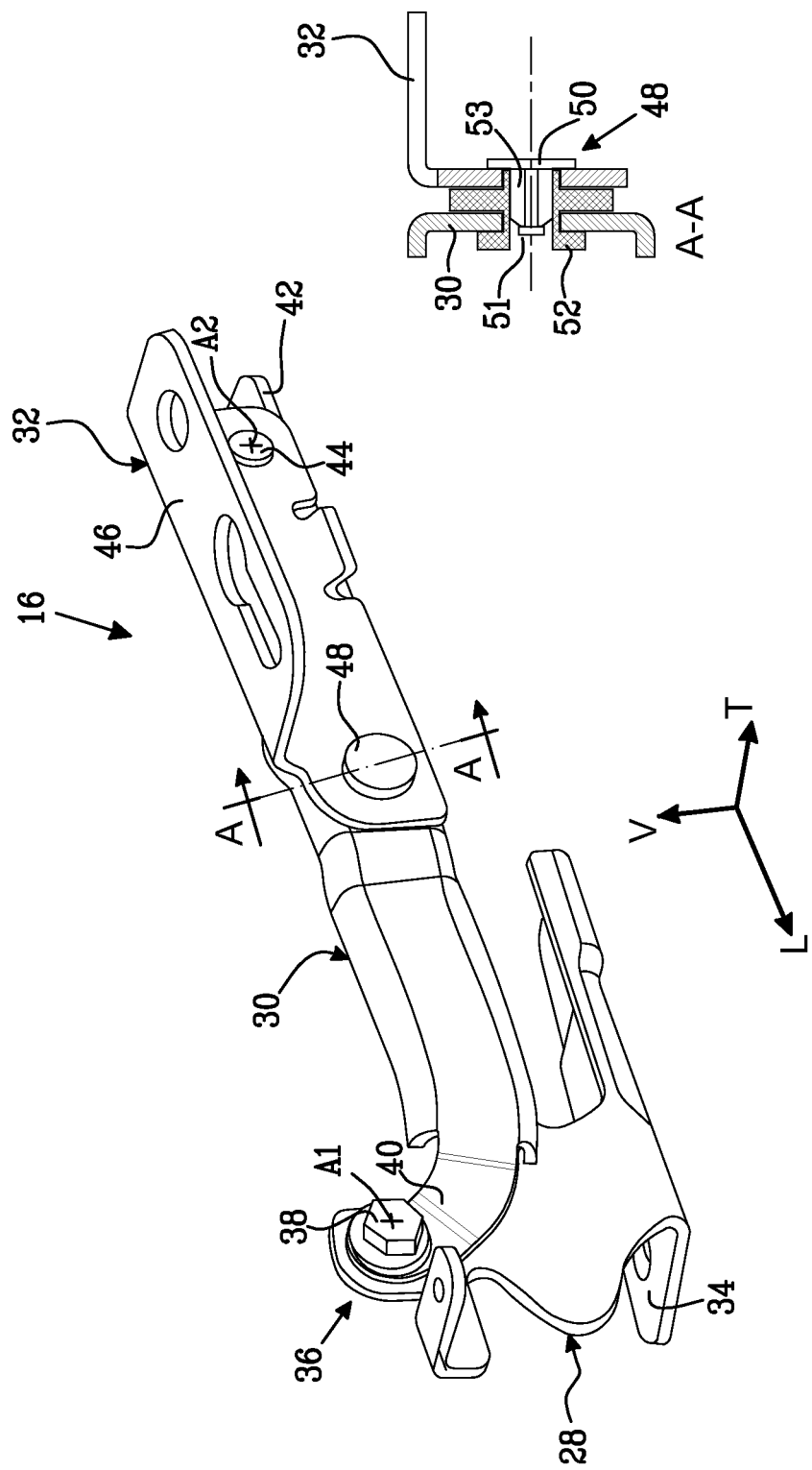
FIG. 3 illustrates a hinge arrangement of the arrangement according to the first embodiment being in a first position.

FIG. 3 illustrates the hinge arrangement 16 being in a first position corresponding to the bonnet 12 being in the closed position A. The hinge arrangement 16 comprises a first hinge member 28, a second hinge member 30 and a third hinge member 32. FIG. 3 is a side view showing the first hinge member 28 behind the second hinge member 30, which in turn is behind the third hinge member 32. The third hinge member 32 is thus the hinge member located closest to a longitudinal centerline of the vehicle 10. The third hinge member 32 is connected to the first hinge member 28 via the second hinge member 30.

The first hinge member 28 comprises an attachment portion 34 for attachment to the body structure 20 of the vehicle 10. The first hinge member 28 may be attached to the body structure 20 of the vehicle 10 by any suitable fastening means, for example by screwing or by welding at the attachment portion 34. It may be attached directly to the body structure 20, or via an additional member, such as a bracket. The first hinge member 28 further comprises an upper portion 36. A first pivot pin 38 located at the upper portion 36 provides the hinged connection between the first 28 and second hinge member 30 around a first pivot axis A1. The pivot pin 38 may be fixedly attached to the first hinge member 28 or the second hinge member 30, or it may be a separate unit. By rotating around the first pivot axis A1, the hinge arrangement 16 may be displaced from the first position, illustrated in FIG. 3, corresponding to that the bonnet 12 is closed, i.e., in position A, to a second position, illustrated in FIG. 4, corresponding to that the bonnet 12 is open, i.e., in position B. This displacement, corresponding to opening the bonnet 12 for maintenance or repair, forms a first functional mode of the hinge arrangement 16.

The second hinge member 30 comprises a hinge arm extending substantially in the longitudinal direction L of the vehicle 10. Its first end 40 is connected to the first hinge member 28 at the first pivot axis A1. The opposite end of the second hinge member 30, i.e., the second end 42, is pivotally connected to the third hinge member 32, by means of e.g., a second pivot pin 44, forming a second pivot axis A2.

The third hinge member 32 is fixedly attachable to the bonnet 12 by any suitable fastening means in an attachment portion 46, for example by screwing or by welding. It may be attached directly to the bonnet 12, or via an additional member.

The hinge arrangement 16 further comprises a retaining member 48. The retaining member 48 prevents relative motion between the third hinge member 32 and the second hinge member 30 at least in the longitudinal L and/or vertical V direction. In the illustrated embodiment the retaining member 48 is further adapted to prevent also relative motion in the transverse direction T. Thereby the third hinge member 32, and hence the bonnet 12 to which it is connected, is retained in a fixed position relative to the rest of the hinge arrangement 16, avoiding, or at least minimizing, the risk of a rattling noise arising from the bonnet 12, e.g., when driving over uneven ground. Further, the risk that the third hinge member 32 is displaced relative to the second hinge member 30 during e.g., adjustment of the bonnet 12 or if a load is applied in the transverse direction T, e.g., due to a side collision, is reduced or avoided.

The retaining member 48 is adapted to be deactivated at a predetermined force. The predetermined force is selected such that it is equal to or less than a force being exerted on the retaining member 48 by the third hinge member 32 when the bonnet 12 is deformed and/or displaced as a result of the airbag arrangement 22 being activated by the pyrotechnical device 26. Further, the predetermined force is selected such that it is larger than a force being exerted on the retaining member 48 by the third hinge member 32 during normal operation of the vehicle 10, e.g., when driving over uneven ground. The predetermined force is selected such that it is also larger than a force being exerted on the retaining member 48 by the third hinge member 32 during normal opening of the bonnet 12 in the first functional mode, i.e., displacement between open and closed bonnet 12, positions A and B of FIG. 1A. Further, it is desired that the predetermined force is selected such that it is larger than a typical force being used when manually adjusting the bonnet 12 and/or during a burglary attempt to open the bonnet 12.

Figure 5:
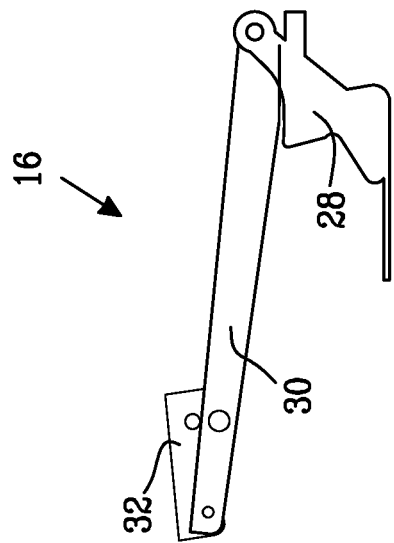
FIG. 5 illustrates the hinge arrangement being in a third position.

The deactivation of the retaining member 48 allows the third hinge member 32 to rotate in relation to the second hinge member 30 at the second pivot axis A2 to a third position of the hinge arrangement 16, illustrated in FIG. 5, corresponding to that the bonnet 12 is deployed, i.e., in position C. The displacement usually starts from the first position, illustrated in FIG. 3, corresponding to the bonnet 12 being in the closed position A. This displacement forms a second functional mode of the hinge arrangement 16. When comparing to FIG.

4 it can be seen that the hinge arrangement 16 has rotated both around the first pivot axis A1 and the second pivot axis A2 to reach the third position.

Figure 4:
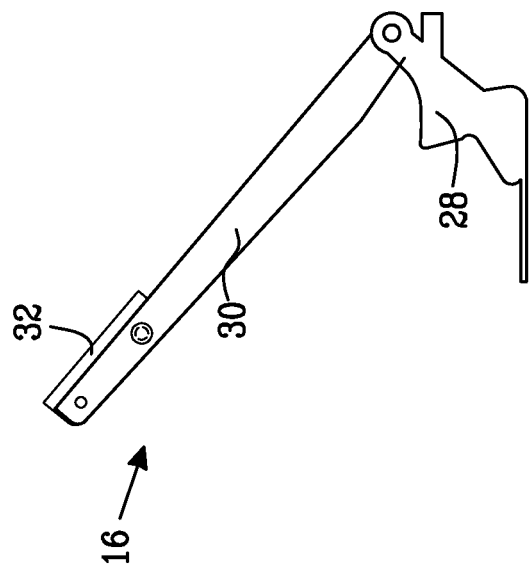
FIG. 4 illustrates the hinge arrangement being in a second position.

In the illustrated embodiment of FIGS. 3-5, the retaining member 48 comprises an expander pin 50 and a hollow axle 52. The expander pin 50 is inserted into the hollow axle 52. The expander pin 50 is configured such that the force needed to detach it from the hollow axle 52 is chosen to be the above-mentioned predetermined force. The retaining member 48 acts as a detachment unit, having the predetermined force as detachment force. Deactivation of the retaining member 48 is obtained by detaching the expander pin 50 from the hollow axle 52 by subjecting the retaining member 48 to a pulling force larger than the predetermined force. The detachment is made in the transverse direction, so it is the transverse component of the force F2, which is to be above the predetermined force. The second hinge member 30 comprises an opening 51 and the third hinge member 32 comprises an opening 53, the retaining member 48 going through the openings 51, 53, which have closed circumferences.

When the retaining member 48 is active, e.g., during normal operation of the vehicle 10, the hollow axle 52 prevents relative motion between the third hinge member 32 and the second hinge member 30 in the longitudinal direction L and the vertical direction V. The expander pin 50 prevents relative motion between the third hinge member 32 and the second hinge member 30 in the transverse direction T. Accordingly, when in place, the retaining member 48 prevents the bonnet 12 from moving into the deployed position C.

Alternative retaining members of the detachment unit type are known by the skilled person, e.g., a rivet, a push nut, a push-on fastener or a locking washer. They are releasable at a certain force, the size of which is selectable by varying the size, shape, material, number of retaining members etc. It would also be possible to use a magnetic detachment unit.

Figure 6C:
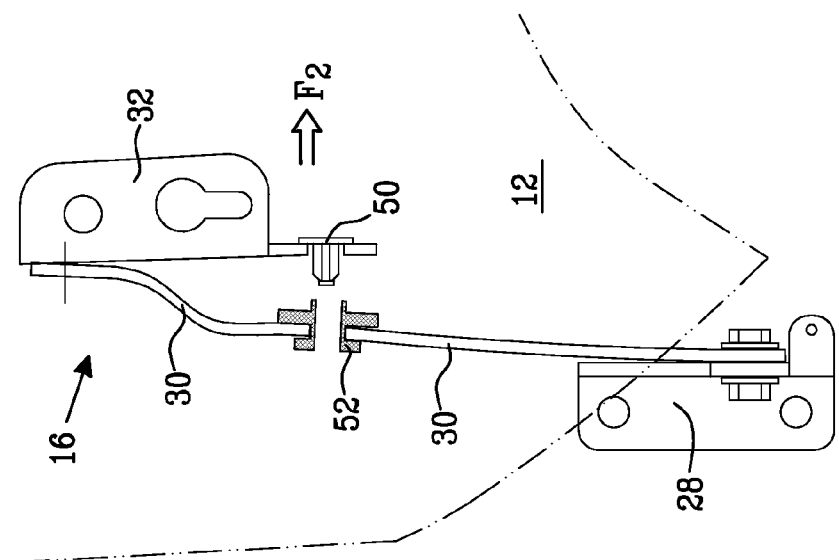
FIGS. 6A-C illustrate what is happening at the hinge arrangement, when an airbag is being deployed.
Figure 6B:
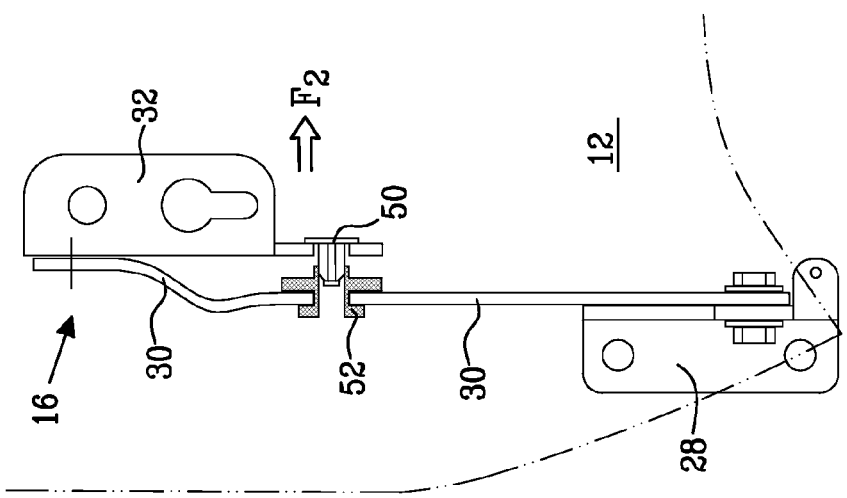
Figure 6A:
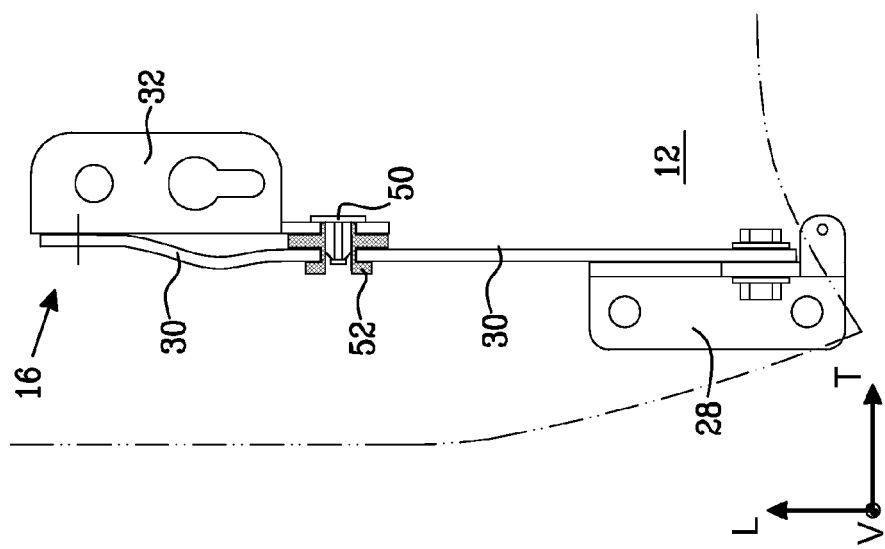

FIGS. 6A-6C illustrate what is happening at the hinge arrangement 16, when the airbag 24 is being deployed, as seen in a top view. Please see also FIGS. 2A and 2B.

FIG. 6A illustrates an initial state with the hinge arrangement 16 being in the first position, corresponding to that the bonnet 12 is in the closed position A.

FIG. 6B illustrates what is happening during deployment of the airbag 24. As a result of the deformation of the bonnet 12, the hinge arrangement 16 is subjected to the force F2 having at least a component in the transverse direction T. Since the force F2 is above the predetermined force, and in particular the transverse component of the force F2 is above the predetermined transverse force, the retaining member 48 is deactivated, in this case by detaching the expander pin 50 from the hollow axle 52. Thereby the hinge arrangement 16 is free to rotate around the second pivot axis A2, i.e., the hinge arrangement 16 assumes its second functional mode.

FIG. 6C illustrates the hinge arrangement 16 being in the third position, corresponding to that the bonnet 12 is in the deployed position C. During the displacement from the first position, as in FIG. 6A, the hinge arrangement 16 has rotated both around the first pivot axis A1 and the second pivot axis A2. Further, the hinge arrangement 16 has been pulled in the transverse direction T, such that the portion 54 of the third hinge member 32, which is distant from the second pivot axis A2 has been displaced in a direction away from the second hinge member 30

Although not illustrated, it would further be possible, that the movement of the second hinge member 30 relative to the first hinge member 28 is a combination of rotation and translation, e.g., in a slot in either or both of the first hinge member 28 and the second hinge member 30. Similarly, the movement of the third hinge member 32 relative to the second hinge member 30 may be a combination of rotation and translation, e.g., in a slot in either or both of the second hinge member 30 and the third hinge member 32.

Figure 7:
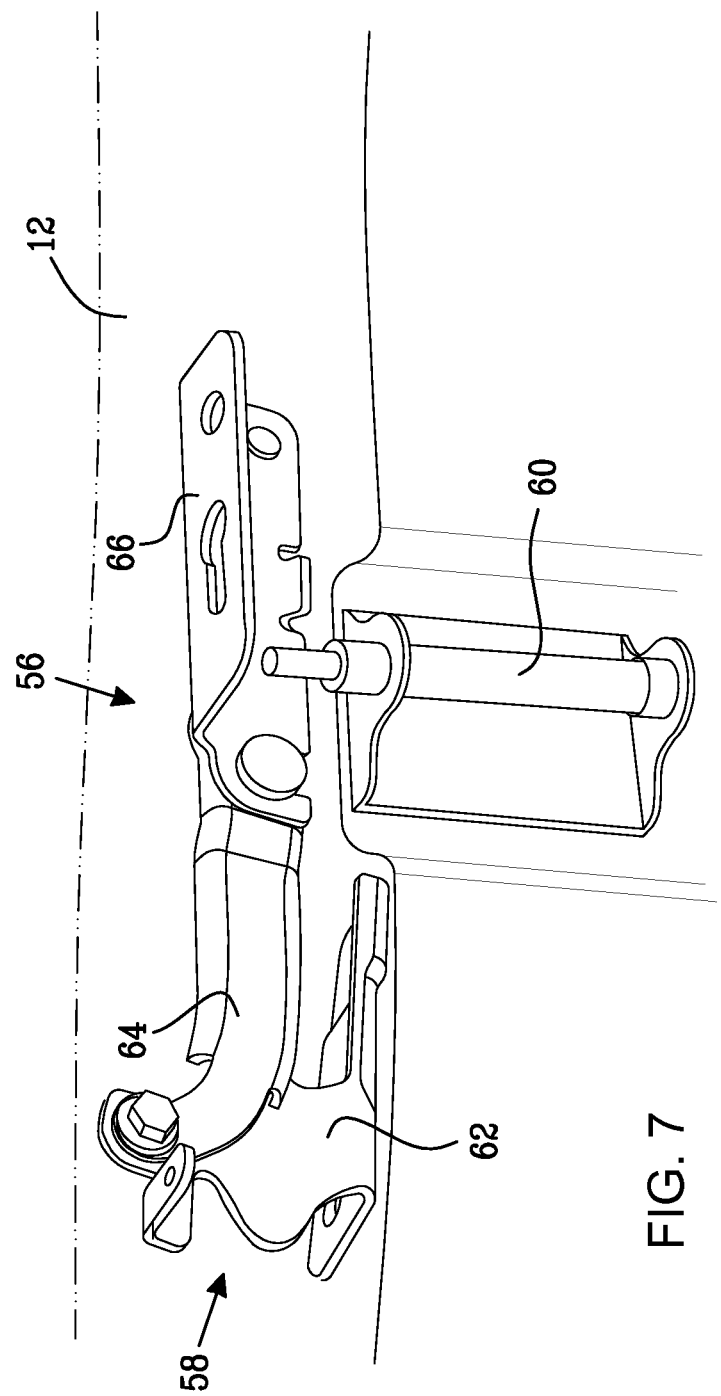
FIG. 7 illustrates an arrangement according to a second embodiment of the disclosure.

FIG. 7 illustrates an arrangement 56 according to a second embodiment of the invention. The arrangement 56 comprises a hinge arrangement 58 and a pyrotechnical piston 60. The pyrotechnical piston 60 is adapted to able to lift the bonnet 12 to a deployed position, see position C of FIG. 1B, in case a collision, or an imminent collision, with a vulnerable road user occurs or is detected. The hinge arrangement 58 comprises a first hinge member 62, a second hinge member 64 and a third hinge member 66, similar to the hinge arrangement described above in conjunction with FIG. 3. During activation of the pyrotechnical piston 60, the third hinge member 66 is to be released from the second hinge member 64 in order to allow rotation around the second pivot axis A2. According to known technology, this may be obtained by means of any suitable mechanical system, e.g., the pyrotechnical piston 60 may push a pre-tensioned connector, which may release one part from another.

The third hinge member 66 and the second hinge member 64 are preferably configured such that they are locked to each other at forces below the predetermined force, i.e., during normal operation of the vehicle, e.g., when driving the vehicle or during normal opening of the bonnet 12. This corresponds to a first functional mode.

When the pyrotechnical piston 60 is activated, it acts on the hinge arrangement 58 in order to displace the bonnet 12 to the deployed position C. According to the second embodiment of the disclosure, the deformation imparted on the hinge arrangement 58 by the pyrotechnical piston 60 is used to release the third hinge member 66 from the second hinge member 64 in order to allow rotation around the second pivot axis A2. This corresponds to a second functional mode of the arrangement 56.

Figure 8:
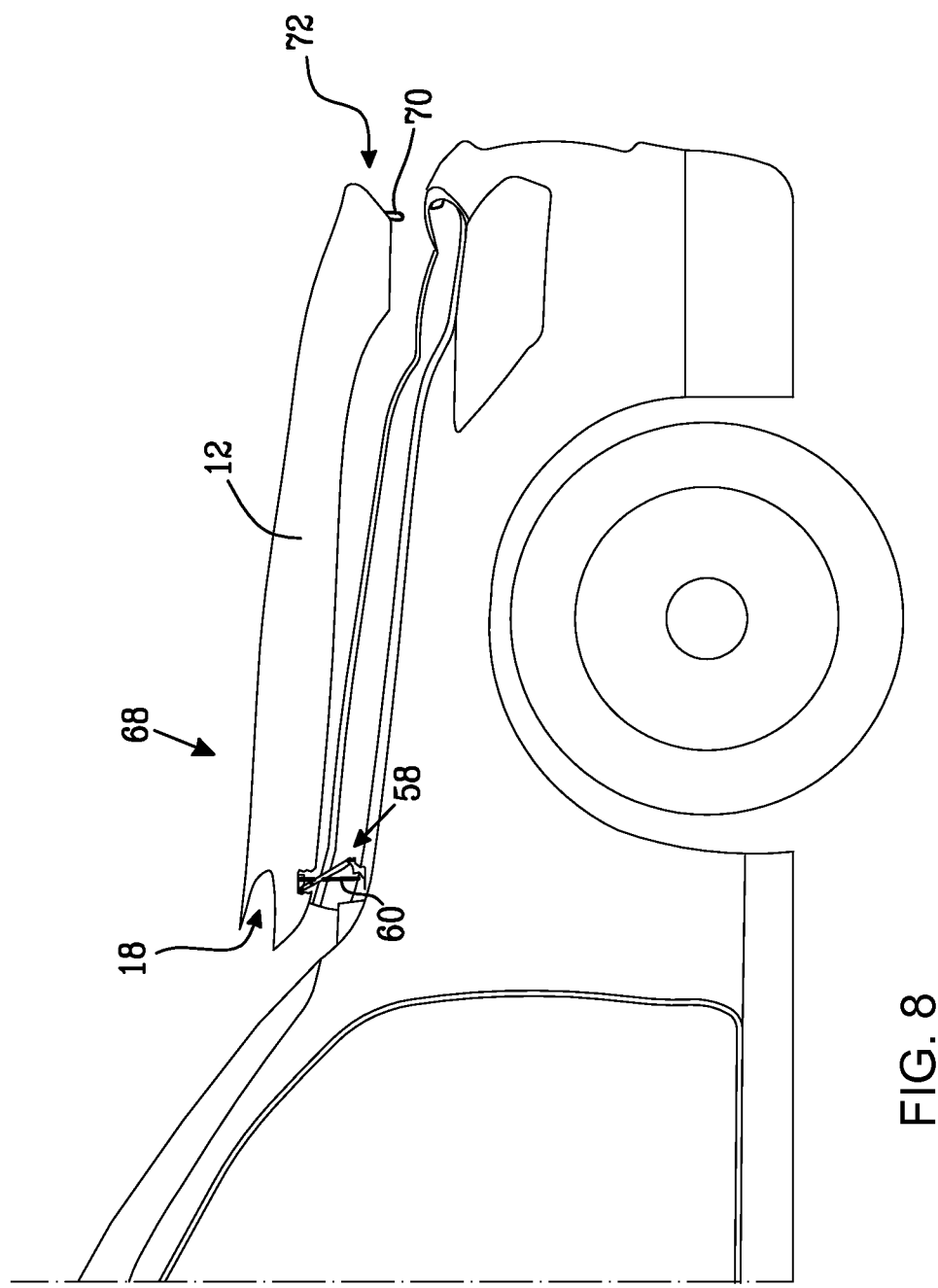
FIG. 8 illustrates an arrangement according to a third embodiment of the disclosure.

FIG. 8 illustrates an arrangement 68 according to a third embodiment of the disclosure. The arrangement 68 comprises the bonnet 12, a hinge arrangement, e.g., like the hinge arrangement 58 of FIG. 7, or a hinge arrangement according to known technology, and a pyrotechnical piston, e.g., like the pyrotechnical piston 60 of FIG. 7. The vehicle further comprises hood lockers 70 at a front end 72 of the bonnet 12. In the third embodiment, the bonnet 12 is intended to be lifted both at the rear end 18 and at the front end 72 in order to reach the deployed position C to provide the desired distance between the bonnet 12 and any hard engine parts.

According to known technology, this may be obtained by using a pyrotechnical piston at each of the hinge arrangements, at one end of the bonnet 12, and at each of the hood lockers, at the other end of the bonnet 12, i.e., at least four pyrotechnical pistons.

When the pyrotechnical piston 60 is activated, it acts on the hinge arrangement 58 in order to displace the bonnet 12 to the deployed position C. According to the third embodiment of the disclosure, the deformation caused on the hinge arrangement 58 at the rear end 18 of the bonnet, deforms and displaces the bonnet 12 including its front end 72, such that the front end 72 becomes raisable by means of a biasing element, e.g., a pre-tensioned resilient element, such as a spring. This corresponds to the second functional mode, while the bonnet 12 in normal use is in the first functional mode. Thereby only two pyrotechnical pistons 60 are utilized.

In the illustrated example of FIG. 8, the hinge arrangements 58 are located at the rear end 18 of the bonnet 12 and the hood lockers 70 at the front end 72, but in other vehicles comprising arrangements according to the disclosure it may be the other way around, i.e., with the hinge arrangements 58 at the front end 72 and the hood lockers 70 at the rear end 18.

The first to third embodiments described above in conjunction with FIGS. 1-8, have in common that the deformation and/or displacement caused by a pyrotechnical device is used to release a component. However, the deformation and/or displacement may also be used to lock a component as described for the fourth embodiment in conjunction with FIG. 9.

Figure 9C:
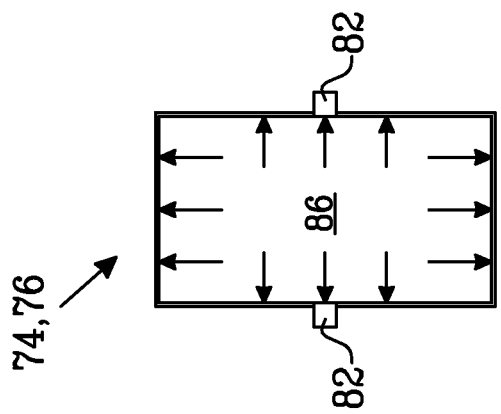
FIGS. 9A-C illustrate an arrangement according to a fourth embodiment of the disclosure.
Figure 9B:
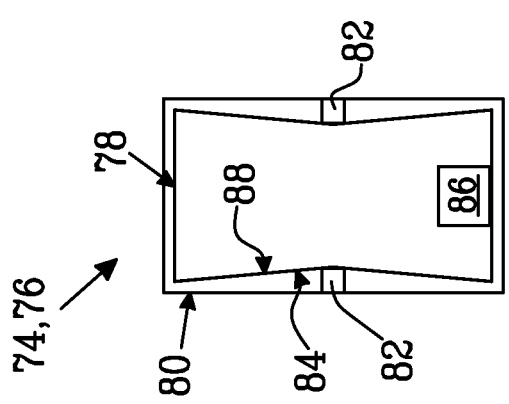
Figure 9A:
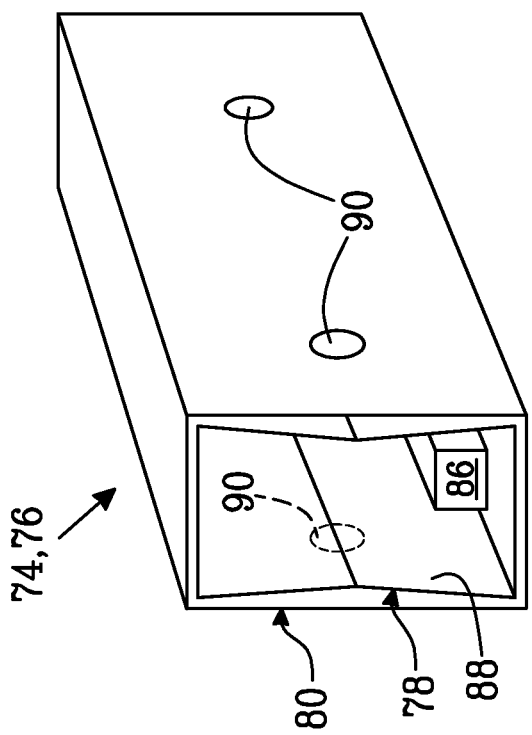

FIGS. 9A-C illustrate an arrangement 74 comprising a beam-in-beam 76. An internal beam 78 is located within a surrounding structure, here in the form of a surrounding beam 80. The internal beam 78 comprises locking elements 82, e.g., one or more pins, located on its external side 84, i.e., the side facing the surrounding beam 80. The arrangement 74 further comprises a pyrotechnical device 86 located within the internal beam 78.

In the initial state, as in FIGS. 9A and 9B, the internal beam 78 is not locked to the surrounding beam 80. The mechanical properties are thus given by the mechanical properties of the internal beam 78 itself.

However, when the pyrotechnical device 86 is activated, the internal beam 78 is exposed to an increased internal pressure at its internal side 88 and hence deforms outwards towards the surrounding beam 80. Thereby the locking elements 82 are forced outwards into a locking engagement with the surrounding beam 80. Purely as an example, the one or more pins may be pushed into fixation holes 90. Thereby, the internal beam 78 and the surrounding beam 80 form a combined structure having improved mechanical properties as compared to the internal beam 78 or the surrounding beam 80 alone.

This principle may be used to rapidly change the mechanical properties of a structure. It may be useful in a front structure of a vehicle in order to adapt the front structure for different collision cases. It may further be useful in a machine, building or construction. The change of stiffness may e.g., be used to change the resonance properties of a building or structure, e.g., in order to avoid damages from an earthquake.

It is obvious for the person skilled in the art that the beam may have an arbitrary cross-section. The locking engagement between the internal beam 78 and the surrounding beam 80 may, as an alternative or a complement, be obtained by friction or by specially designed locking elements 82. The surrounding structure may completely surround the internal structure, or only a portion of it. It would also be possible with the reverse case, i.e., that the surrounding structure is adapted to deform inwards by applying an increased pressure at its external side and/or a decreased pressure at its internal side, such that the surrounding structure is brought into a locking engagement with an internal structure.

While exemplary embodiments are described above, it is not intended that these embodiments describe all possible forms of the invention. Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A bonnet arrangement for a vehicle, the bonnet arrangement comprising:

a bonnet forming a first mechanical structure;

an actuator including a pyrotechnical device adapted to, directly or indirectly, influence the first mechanical structure at a first location, such that the first mechanical structure is exposed to a deformation and/or a displacement, wherein the deformation and/or the displacement of the first mechanical structure at the first location is adapted to, at a second location different from the first location, change a functional mode of the first mechanical structure and/or of a second mechanical structure adapted to be connected to the first mechanical structure by means of direct mechanical influence;

a hinge arrangement for providing a hinged connected between the bonnet and a body structure of the vehicle, the hinge arrangement forming the second mechanical structure;

wherein the actuator is adapted to displace the bonnet from a closed position to a deployed position upon activation of the pyrotechnical device, the bonnet thereby being exposed to the deformation and/or the displacement at the first location, wherein the hinge arrangement in a first functional mode is displaceable between a first position corresponding to the closed position of the bonnet and a second position corresponding to an open position of the bonnet, and in a second functional mode is displaceable between the first position corresponding to the closed position of the bonnet and a third position corresponding to the deployed position of the bonnet, wherein the bonnet is connectable to the hinge arrangement such that the deformation and/or the displacement of the bonnet causes the hinge arrangement to change from the first functional mode to the second functional mode;

wherein the hinge arrangement comprises:

a first hinge member adapted to be attached, directly or indirectly, to the body structure of the vehicle;

a second hinge member having a first end and a second end;

a third hinge member adapted to be attached, directly or indirectly, to the bonnet, and a retaining member adapted to connect the third hinge member to the second hinge member;

the first end of the second hinge member being adapted to be pivotally connected to the first hinge member at a first pivot axis for providing the first functional mode;

the second end of the second hinge member being adapted to be pivotally connected to the third hinge member at a second pivot axis for providing the second functional mode;

the retaining member being configured to prevent relative motion between the second hinge member and the third hinge member in a longitudinal and/or a vertical direction;

the retaining member being adapted to be deactivated at a predetermined force, which predetermined force is equal to or less than a force exertable on the retaining member by the third hinge member when the bonnet is deformed and/or displaced as a result of the actuator being activated, and which predetermined force is larger than a force exertable on the retaining member by the third hinge member during normal operation of the vehicle and during normal opening of the bonnet in the first functional mode;

the deactivation of the retaining member allowing the third hinge member to pivot in relation to the second hinge member, such that the bonnet may assume the deployed position in the second functional mode; and wherein the retaining member is adapted to be deactivated in a transverse direction of the vehicle, the predetermined force having at least a transverse component.

2. The bonnet arrangement according to claim 1 wherein the retaining member further is adapted to prevent relative motion between the second hinge member and the third hinge member in the transverse direction.

3. The bonnet arrangement according to claim 1 wherein the predetermined force is between 0.1 and 10 kN.

4. The bonnet arrangement according to claim 1 wherein the predetermined force is between 0.2 and 8 kN.

5. The bonnet arrangement according to claim 1 wherein the retaining member comprises a detachment unit having the predetermined force as a detachment force.

6. The bonnet arrangement according to claim 5 wherein the detachment unit comprises an expander pin, a rivet, a push nut, a push-on fastener or a locking washer.

7. The bonnet arrangement according to claim 1 wherein the second hinge member and/or the third hinge member comprises an opening, the retaining member being configured to go through the opening.

8. The bonnet arrangement according to claim 1 wherein the retaining member is adapted to be located at, or adjacent to, an end of the third hinge member, which end is opposite to the second pivot axis.

9. The bonnet arrangement according to claim 1 wherein the retaining member comprises a friction means configured to be located at the second hinge member and/or the third hinge member, the friction means being adapted to retain the third hinge member to the second hinge member in the longitudinal and/or vertical direction, but allow a portion of the third hinge member to move away from the second hinge member in the transverse direction, thereby allowing the third hinge member to pivot in relation to the second hinge member, such that the bonnet may assume the deployed position.

10. A vehicle comprising an arrangement according to claim 1.

11. The bonnet arrangement according to claim 1 wherein the actuator comprises an airbag arrangement including an airbag and the pyrotechnical device, and wherein the airbag arrangement is adapted to displace the bonnet from the closed position to the deployed position by inflating the airbag upon activation of the pyrotechnical device, the bonnet thereby being exposed to the deformation and/or the displacement at the first location corresponding to the airbag.

12. The bonnet arrangement according to claim 1 wherein the transverse component of the predetermined force is between 0.1 and 10 kN.

13. The bonnet arrangement according to claim 1 wherein the transverse component of the predetermined force is between 0.2 and 8 kN.

14. The bonnet arrangement according to claim 1 wherein the transverse component of the predetermined force is between 0.8 and 3 kN.

15. A bonnet arrangement for a vehicle, the bonnet arrangement comprising:
    a bonnet forming a first mechanical structure;
    an actuator including a pyrotechnical device adapted to, directly or indirectly, influence the first mechanical structure at a first location, such that the first mechanical structure is exposed to a deformation and/or a displacement, wherein the deformation and/or the displacement of the first mechanical structure at the first location is adapted to, at a second location different from the first location, change a functional mode of the first mechanical structure and/or of a second mechanical structure adapted to be connected to the first mechanical structure by means of direct mechanical influence;
    a hinge arrangement for providing a hinged connection between the bonnet and a body structure of the vehicle, the hinge arrangement forming the second mechanical structure;
    wherein the actuator is adapted to displace the bonnet from a closed position to a deployed position upon activation of the pyrotechnical device, the bonnet thereby being exposed to the deformation and/or the displacement at the first location;
    wherein the hinge arrangement in a first functional mode is displaceable between a first position corresponding to the closed position of the bonnet and a second position corresponding to an open position of the bonnet, and in a second functional mode is displaceable between the first position corresponding to the closed position of the bonnet and a third position corresponding to the deployed position of the bonnet;
    wherein the bonnet is connectable to the hinge arrangement such that the deformation and/or the displacement of the bonnet causes the hinge arrangement to change from the first functional mode to the second functional mode;
    wherein the hinge arrangement comprises:
        a first hinge member adapted to be attached, directly or indirectly, to the body structure of the vehicle;
        a second hinge member having a first end and a second end;
        a third hinge member adapted to be attached, directly or indirectly, to the bonnet; and
        a retaining member adapted to connect the third hinge member to the second hinge member;
        the first end of the second hinge member being adapted to be pivotally connected to the first hinge member at a first pivot axis for providing the first functional mode;
        the second end of the second hinge member being adapted to be pivotally connected to the third hinge member at a second pivot axis for providing the second functional mode;
        the retaining member being configured to prevent relative motion between the second hinge member and the third hinge member in a longitudinal and/or a vertical direction;
        the retaining member being adapted to be deactivated at a predetermined force, which predetermined force is equal to or less than a force exertable on the retaining member by the third hinge member when the bonnet is deformed and/or displaced as a result of the actuator being activated, and which predetermined force is larger than a force exertable on the retaining member by the third hinge member during normal operation of the vehicle and during normal opening of the bonnet in the first functional mode;
        the deactivation of the retaining member allowing the third hinge member to pivot in relation to the second hinge member, such that the bonnet may assume the deployed position in the second functional mode; and
    wherein the retaining member comprises a detachment unit having the predetermined force as a detachment force, and the detachment unit comprises an expander pin, a rivet, a push nut, a push-on fastener or a locking washer.

16. The bonnet arrangement according to claim 15 wherein the actuator comprises an airbag arrangement including an airbag and the pyrotechnical device, and wherein the airbag arrangement is adapted to displace the bonnet from the closed position to the deployed position by inflating the airbag upon activation of the pyrotechnical device, the bonnet thereby being exposed to the deformation and/or the displacement at the first location corresponding to the airbag.

17. The bonnet arrangement according to claim 15 wherein the predetermined force has at least a transverse component, and wherein the transverse component of the predetermined force is between 0.1 and 10 kN.

18. A bonnet arrangement for a vehicle, the bonnet arrangement comprising:
- a bonnet forming a first mechanical structure;
- an actuator including a pyrotechnical device adapted to, directly or indirectly, influence the first mechanical structure at a first location, such that the first mechanical structure is exposed to a deformation and/or a displacement, wherein the deformation and/or the displacement of the first mechanical structure at the first location is adapted to, at a second location different from the first location, change a functional mode of the first mechanical structure and/or of a second mechanical structure adapted to be connected to the first mechanical structure by means of direct mechanical influence;
- a hinge arrangement for providing a hinged connection between the bonnet and a body structure of the vehicle, the hinge arrangement forming the second mechanical structure;
- wherein the actuator is adapted to displace the bonnet from a closed position to a deployed position upon activation of the pyrotechnical device, the bonnet thereby being exposed to the deformation and/or the displacement at the first location;
- wherein the hinge arrangement in a first functional mode is displaceable between a first position corresponding to the closed position of the bonnet and a second position corresponding to an open position of the bonnet, and in a second functional mode is displaceable between the first position corresponding to the closed position of the bonnet and a third position corresponding to the deployed position of the bonnet;
- wherein the bonnet is connectable to the hinge arrangement such that the deformation and/or the displacement of the bonnet causes the hinge arrangement to change from the first functional mode to the second functional mode;
- wherein the hinge arrangement comprises:
  - a first hinge member adapted to be attached, directly or indirectly, to the body structure of the vehicle;
  - a second hinge member having a first end and a second end;
  - a third hinge member adapted to be attached, directly or indirectly, to the bonnet; and
  - a retaining member adapted to connect the third hinge member to the second hinge member;
  - the first end of the second hinge member being adapted to be pivotally connected to the first hinge member at a first pivot axis for providing the first functional mode;
  - the second end of the second hinge member being adapted to be pivotally connected to the third hinge member at a second pivot axis for providing the second functional mode;
  - the retaining member being configured to prevent relative motion between the second hinge member and the third hinge member in a longitudinal and/or a vertical direction;
  - the retaining member being adapted to be deactivated at a predetermined force, which predetermined force is equal to or less than a force exertable on the retaining member by the third hinge member when the bonnet is deformed and/or displaced as a result of the actuator being activated, and which predetermined force is larger than a force exertable on the retaining member by the third hinge member during normal operation of the vehicle and during normal opening of the bonnet in the first functional mode;
  - the deactivation of the retaining member allowing the third hinge member to pivot in relation to the second hinge member, such that the bonnet may assume the deployed position in the second functional mode; and
- wherein the retaining member comprises a friction means adapted to be located at the second hinge member and/or the third hinge member, the friction means being adapted to retain the third hinge member to the second hinge member in the longitudinal and/or vertical direction, but allow a portion of the third hinge member to move away from the second hinge member in the transverse direction, thereby allowing the third hinge member to pivot in relation to the second hinge member, such that the bonnet may assume the deployed position.

19. The bonnet arrangement according to claim 18 wherein the actuator comprises an airbag arrangement including an airbag and the pyrotechnical device, and wherein the airbag arrangement is adapted to displace the bonnet from the closed position to the deployed position by inflating the airbag upon activation of the pyrotechnical device, the bonnet thereby being exposed to the deformation and/or the displacement at the first location corresponding to the airbag.

20. The bonnet arrangement according to claim 18 wherein the predetermined force has at least a transverse component, and wherein the transverse component of the predetermined force is between 0.1 and 10 kN.

* * * * *